United States Patent
Kulkarni et al.

(10) Patent No.: US 7,430,691 B2
(45) Date of Patent: Sep. 30, 2008

(54) METHOD, SYSTEM, AND PRODUCT FOR PROVIDING EXTENDED ERROR HANDLING CAPABILITY IN HOST BRIDGES

(75) Inventors: Ashwini Kulkarni, Austin, TX (US); Douglas Wayne Oliver, Round Rock, TX (US); Steven Vongvibool, Austin, TX (US); David R. Willoughby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1135 days.

(21) Appl. No.: 10/682,401

(22) Filed: Oct. 9, 2003

(65) Prior Publication Data

US 2005/0081126 A1 Apr. 14, 2005

(51) Int. Cl.
*G06F 11/00* (2006.01)
(52) U.S. Cl. .......................................... 714/44; 714/43
(58) Field of Classification Search .................... 714/44
See application file for complete search history.

(56) References Cited

U.S. PATENT DOCUMENTS

| | | | |
|---|---|---|---|
| 2002/0184576 A1* | 12/2002 | Arndt et al. | 714/48 |
| 2004/0210793 A1* | 10/2004 | Chokshi et al. | 714/5 |
| 2004/0260981 A1* | 12/2004 | Kitamorn et al. | 714/43 |

* cited by examiner

*Primary Examiner*—Scott T. Baderman
*Assistant Examiner*—Paul F Contino
(74) *Attorney, Agent, or Firm*—Duke W. Yee; Diana R. Gerhardt; Mari Stewart

(57) ABSTRACT

A method, system, and computer program product in a logical partitioned data processing system are disclosed for providing a host bridge that implements extended error handling (EEH). If all devices coupled to the host bridge implement EEH, the host bridge is initialized to operate in EEH mode. In EEH mode, the devices handle any error that occurs within the devices without reporting the error to the host bridge. All partitions that share the host bridge continue to operate without being terminated while the devices are handling the error. If at least one device does not implement EEH, the host bridge is initialized to operate in non-EEH mode. In non-EEH mode, a machine check is generated by the host bridge when an error occurs within one of the devices resulting in the termination of all partitions that share the host bridge in response to a receipt of the machine check.

11 Claims, 4 Drawing Sheets

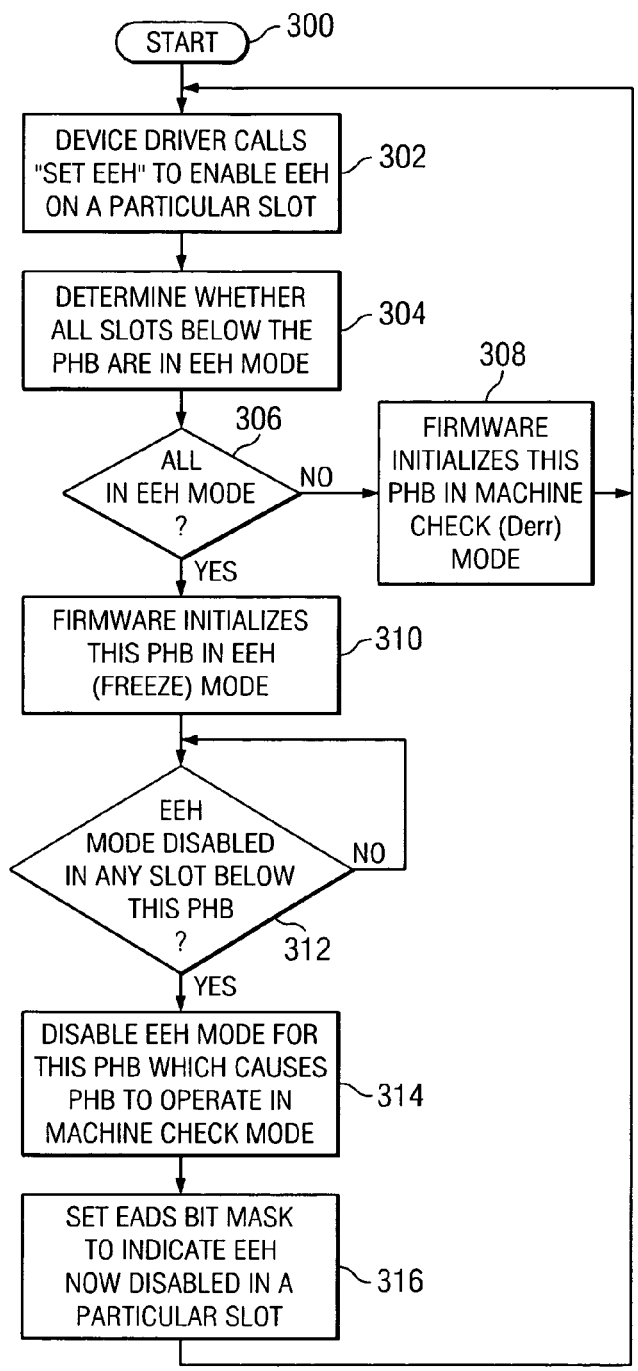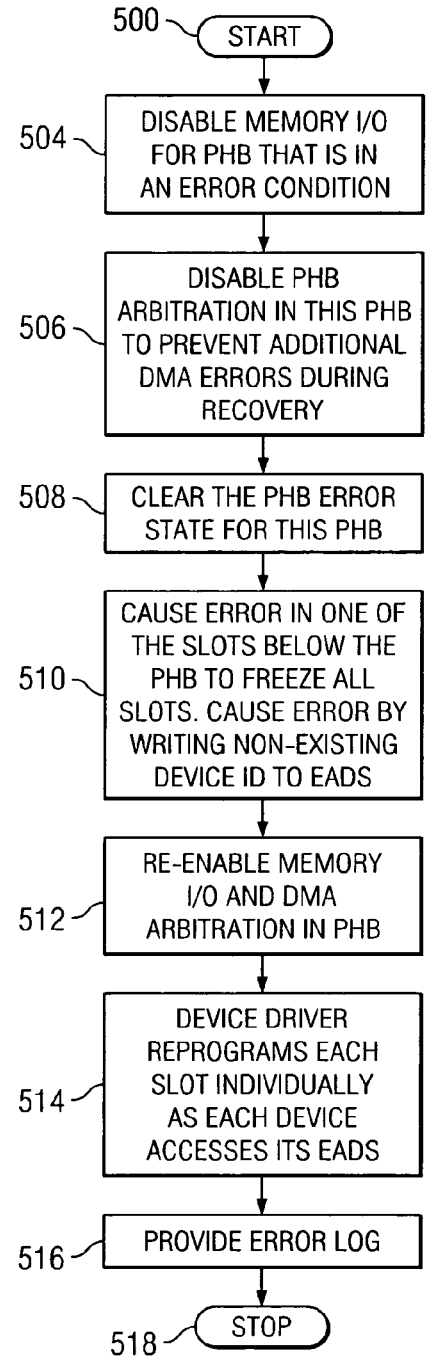
FIG. 3
FIG. 5

METHOD, SYSTEM, AND PRODUCT FOR PROVIDING EXTENDED ERROR HANDLING CAPABILITY IN HOST BRIDGES

BACKGROUND OF THE INVENTION

1. Technical Field

The present invention relates generally to an improved data processing system, and in particular to a method, system, and product for handling errors in a data processing system. Still more particularly, the present invention provides a method, system, and product for providing extended error handling (EEH) in host bridges.

2. Description of Related Art

A logical partitioned (LPAR) functionality within a data processing system (platform) allows multiple copies of a single operating system (OS) or multiple heterogeneous operating systems to be simultaneously run on a single data processing system platform. A partition, within which an operating system image runs, is assigned a non-overlapping subset of the platform's resources. These platform allocable resources include one or more architecturally distinct processors with their interrupt management area, regions of system memory, and input/output (I/O) adapter bus slots. The partition's resources are represented by the platform's firmware to the OS image.

Each distinct OS or image of an OS running within the platform is protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an operating system's allocated resources are prevented from affecting the resources of any other image. Thus, each image of the OS (or each different OS) directly controls a distinct set of allocable resources within the platform.

With respect to hardware resources in an LPAR system, these resources are disjointly shared among various partitions, themselves disjoint, each one appearing to be a stand-alone computer. These resources may include, for example, input/output (I/O) adapters, memory dimms, non-volatile random access memory (NVRAM), and hard disk drives. Each partition within the LPAR system may be booted and shutdown repeatedly without having to power-cycle the whole system.

In reality, some of the I/O devices that are disjointly shared among the partitions are themselves controlled by a common piece of hardware, such as a host Peripheral Component Interface (PCI) bridge, also referred to herein as a PHB, which may have many I/O adapters controlled by or below the bridge. Devices are coupled to the PHB utilizing these I/O adapters. This bridge may be thought of as being shared by all of the partitions that are assigned to its slots. Hence, if the bridge becomes inoperable, it affects all of the partitions that share the devices that are below the bridge. Indeed, the problem itself may be so severe that the whole LPAR system will crash if any partition attempts to further use the bridge. In other words, with a crash, the entire LPAR system fails. The normal course of action is to terminate the running partitions that share the bridge, which will keep the system from crashing due to this failure.

When an device error, also referred to herein as a device error, occurs, the PCI Host Bridge (PHB) to which the device is coupled assumes a non-usable, or error, state. This PHB then generates a machine check which in turn invokes a machine check interrupt (MCI) handler. The MCI handler reports the error and terminates all of the partitions to which the PHB is assigned. This process is a "normal" solution that prevents the whole LPAR system from crashing due to a device error.

A single PHB typically supports multiple slots each of which may be assigned to different partitions. When a device error occurs in a slot that is coupled to a PHB, the device error will cause the termination of the partition to which the faulty device is assigned and will also cause the termination of all other partitions to which the other slots of the PHB are assigned when the adapter that generated the error does not support extended error handling.

When a partition is terminated, it must be rebooted before it can be utilized again. Terminating and then rebooting a partition may result in the loss of critical data that was being processed when the error occurred and the partition was terminated.

The problem described above occurs when the faulty adapter that has the error does not support extended error handling (EEH). When a faulty adapter does support EEH, the EEH features prevent the device error from propagating from the slot to the PHB which supports the slot. When a faulty adapter does not support EEH, the device error propagates, as described above, from the slot to the PHB which supports the slot resulting in the termination of all partitions that share the PHB.

When a device supports EEH, the device itself processes and reports errors on its own without requiring the generation of a machine check or a termination of its associated partition and the other partitions.

Therefore, a need exists for a method, system, and product for providing a PHB which supports EEH when coupled to devices that support EEH so that an error that occurs in one device will not cause all of the partitions that share the PHB to be terminated.

SUMMARY OF THE INVENTION

A method, system, and computer program product in a logical partitioned data processing system are disclosed for providing a host bridge that implements extended error handling in logical partitioned data processing systems. The host bridge is coupled to at least one device below the bridge. A determination is made regarding whether all devices coupled below the host bridge implement extended error handling. If all devices coupled below the host bridge implement extended error handling, the host bridge is initialized to operate in extended error handling mode. If at least one device does not implement extended error handling, the host bridge is initialized to operate in non-extended error handling mode.

When the host bridge is in extended error handling mode, the devices handle any error that occurs within the devices without propagating the error above the host bridge so that all partitions that share the host bridge continue to operate without being terminated while the devices are handling the error. When the host bridge is in non-extended error handling mode, a machine check is generated by the host bridge when an error occurs within one of the devices resulting in the termination of all partitions that share the host bridge.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts a high level flow chart which illustrates setting either a machine check or extended error handling operating mode for a PHB depending on whether all slots below the PHB have devices that support extended error handling in accordance with a preferred embodiment of the present invention;

FIG. 5 depicts a high level flow chart which illustrates performing error recovery for a PHB when the PHB is in extended error handling mode in accordance with a preferred embodiment of the present invention.

DETAILED DESCRIPTION OF THE PREFERRED EMBODIMENT

Figure 1:
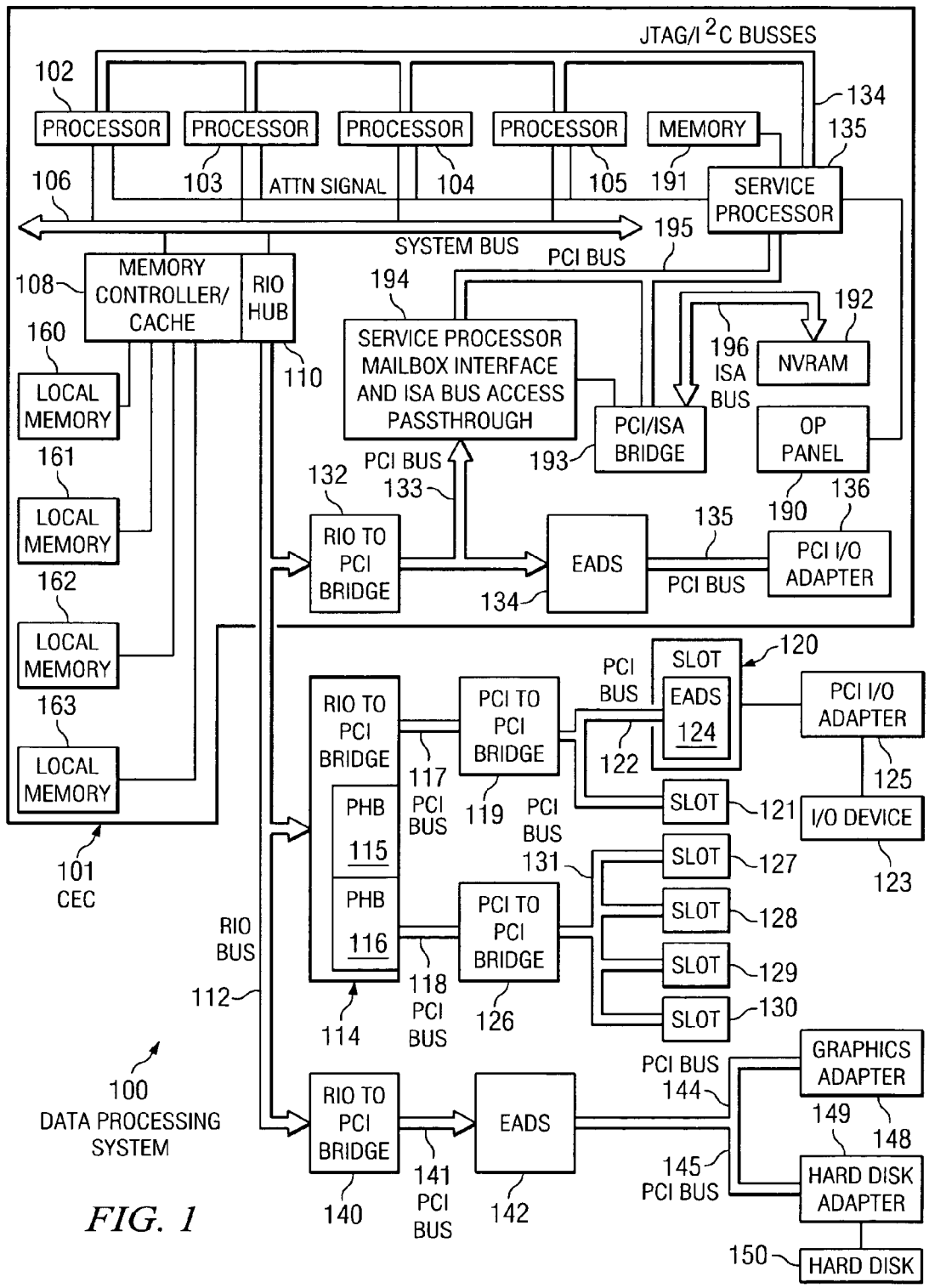
FIG. 1 is a block diagram of a data processing system in which the present invention may be implemented in accordance with the present invention.

A preferred embodiment of the present invention and its advantages are better understood by referring to the figures, like numerals being used for like and corresponding parts of the accompanying figures.

A method, system, and computer program product are disclosed for providing a PCI host bridge (PHB) that is capable of operating in extended error handling (EEH) mode when all devices below that PHB are operating in EEH mode. A PHB may be in either a machine check mode or an EEH mode. When any device below the PHB does not implement EEH, the PHB will operate in machine check mode causing a termination of all partitions that share the PHB when an error is reported to the PHB by one of the devices below the PHB. When all of the devices below the PHB do implement EEH, the PHB will operate in EEH mode which does not cause a termination of all of the partitions that share the PHB when an error is reported to the PHB by one of the devices below the PHB.

When a PHB is in EEH mode and an error is reported to it by one of the devices below the PHB, the PHB's ability to generate a machine check will be disabled. Memory input/output (I/O) and DMA request processing are also disabled for the PHB. An indication of the error will be reported to all devices below the PHB. The error is then cleared in the PHB. Once the error is cleared, memory I/O and DMA capabilities are restored to the PHB. Thus, the PHB is temporarily frozen while the error is processed by the PHB. Once an error recovery process has been executed for the PHB, the PHB is unfrozen. In this manner, the partitions do not need to be terminated and no data will be lost during the process.

Because all devices below the PHB are EEH enabled, the devices are able to process the error without requiring the PHB to be involved and without requiring a machine check. Therefore, after the error was reported to the PHB, the PHB is able to be unfrozen and to continue operating while the devices themselves process and clear the error. This enables the PHB to continue to operate without generating a machine check and without any partitions being terminated while the devices below the PHB process and clear the error.

The processes of the present invention are executed at run time. Further, these processes are dynamic so that the mode of a PHB may change dynamically from EEH to machine check and back to EEH mode while the machine continues its operation depending on the status of the EEH modes of the devices below the PHB.

The present invention may be used in a system that implements a combination of both EEH and non-EEH devices under one PHB, or that implements only EEH devices under a single PHB. The present invention determines which type of implementation is currently employed, either EEH only devices or a combination of EEH and non-EEH devices, and dynamically adjusts the mode of the PHB accordingly. Thus, when the implementation employs only EEH devices below a PHB, the PHB is EEH enabled. When the implementation employs both EEH and non-EEH devices, the PHB is not EEH enabled and instead processes errors through machine checks.

Further, when an implementation changes from EEH only to a combination of EEH and non-EEH, the PHB dynamically changes its mode during run time operation from EEH to machine check without interrupting other processing. Similarly, when an implementation changes from a combination of EEH and non-EEH to EEH only, the PHB dynamically changes its mode during run time operation from machine check mode (non-EEH) to EEH mode without interrupting other processing.

The present invention provides for a selectable machine check mode for each PHB. The machine check mode may be turned on and off for each PHB separately by utilizing a particular bit within the PHB. The machine check mode may be programmably selected for individual PHBs. In this manner, any subset of PHBs may be operated in EEH mode while the remaining PHBs in the system are operated in machine check mode.

When the mode bit in a PHB is set to a first value, the machine check mode is turned on for that PHB. When the mode bit is set to a second value, the machine check mode is turned off for that PHB. According to the present invention, when the bit is set to the second value, the machine check mode is turned off which will indicate that the PHB is in EEH mode. Thus, when the machine check mode is turned off for a particular PHB, the PHB is said to be in EEH mode, or EEH enabled.

When the devices below a PHB are all EEH enabled and an error is reported by a device driver, the EADS to which the device driver's device is connected will enter an error state which will report an error indicator to any device driver that attempts to execute a load to its device. When a device driver receives this error indicator, which is usually a particular value such as "FF", the device driver attempts to process and then clear the error. In this manner, the error is reported to each device below the PHB without the error being indicated on the PCI bus which connects the device to its PHB, and without the error subsequently being indicated to the RIO hub.

Devices that are not EEH enabled are not required to detect hardware error conditions and states. Instead, non-EEH devices depend upon a PHB signaling a machine check, i.e. issuing a Derr signal, to a partition to indicate an error when an error occurred during a device driver load operation to a device below that PHB.

FIG. 1 depicts a block diagram of a data processing system in which the present invention may be implemented in accordance with the present invention. Data processing system 100 may be a symmetric multiprocessor (SMP) system including a plurality of processors 102, 103, 104, and 105 connected to system bus 106. For example, data processing system 100 may be an IBM RS/6000, a product of International Business Machines Corporation in Armonk, N.Y. Data processing system 100 includes a central electronic complex 101 which includes logically partitioned hardware. CEC 101 includes a plurality of processors 102, 103, 104, and 105 connected to system bus 106. Alternatively, a single processor system may be employed. Also connected to system bus 106 is memory controller/cache 108, which provides an interface to a plurality of local memories 160-163. RIO Hub 110 is connected to system bus 106 and provides an interface to RIO bus 112. Memory controller/cache 108 and RIO Hub 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI slots, to which PCI I/O adapters may be coupled, such as slots 120, 121, and 127-130, graphics adapter 148, and hard disk adapter 149 may each be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of slots 120, 121, and 127-130, graphics adapter 148, hard disk adapter 149, each of host processors 102-105, and each of local memories 160-163 is assigned to one of the three partitions. For example, processor 102, local memory 160, and slots 120, 127, and 129 may be assigned to logical partition P1; processors 103-104, local memory 161, and slot 121 may be assigned to partition P2; and processor 105, local memories 162-163, slots 128 and 130, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance, also called an image, of the AIX operating system may be executing within partition P2, and a Windows 2000 operating system may be operating within logical partition P3. Windows 2000 is a product and trademark of Microsoft Corporation of Redmond, Wash.

RIO to PCI bridge 114 is connected to RIO bus 112 and provides an interface to PCI bus 117 and PCI bus 118. RIO to PCI bridge 114 includes one or more PCI host bridges (PHB), such as PHB 115 and PHB 116. Each PHB is coupled to a PCI to PCI bridge through a PCI bus. For example, PHB 115 is coupled to PCI to PCI bridge 119 through PCI bus 117. PHB 116 is coupled to PCI to PCI bridge 126 through PCI bus 118. Each PCI to PCI bridge is coupled to one or more PCI slots. For example, PCI to PCI bridge 119 is coupled to slot 120 and slot 121 using PCI bus 122. Although only two slots are shown, typically either four or eight slots are supported by each PHB. PCI to PCI bridge 126 is coupled to slots 127-130 using PCI bus 131.

Slots 120 and 121 are said to be below and supported by PHB 115. Slots 127, 128, 129, and 130 are said to be below and supported by PHB 116.

Each slot includes an EADS chip to which a PCI I/O adapter may be attached. For example, slot 120 includes EADS 124. An I/O adapter may be inserted into a slot and thus coupled to an EADS. For example, I/O adapter 125 is inserted into slot 120 and coupled to EADS 124. An I/O device may be coupled to data processing system 100 utilizing an I/O adapter. For example, as depicted, I/O device 123 is coupled to I/O adapter 125.

A memory mapped graphics adapter 148 may be connected to RIO bus 112 through PCI bus 144, EADS 142, PCI bus 141, and RIO to PCI bridge 140. A hard disk 150 may be coupled to hard disk adapter 149 which is connected to PCI bus 145. In turn, this bus is connected to EADS 142, which is connected to RIO to PCI Bridge 140 by PCI bus 141.

An RIO to PCI bridge 132 provides an interface for a PCI bus 133 to connect to RIO bus 112. PCI I/O adapter 136 is connected to EADS 134 by PCI bus 135. EADS 132 is connected to PCI bus 133. This PCI bus also connects RIO to PCI bridge 132 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 102-105 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 102, 103, 104, and 105 are connected together to an interrupt input signal of the service processor. The service processor 135 has its own local memory 191, and has access to the hardware OP-panel 190.

When data processing system 100 is initially powered up, service processor 135 uses the JTAG/scan I$^2$C busses 134 to interrogate the system (host) processors 102-105, memory controller/cache 108, and RIO Hub 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 102-105, memory controller/cache 108, and RIO Hub 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases the host processors 102-105 for execution of the code loaded into host memory 160-163. While the host processors 102-105 are executing code from respective operating systems within the data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 102-105, local memories 160-163, and RIO Hub 110. Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
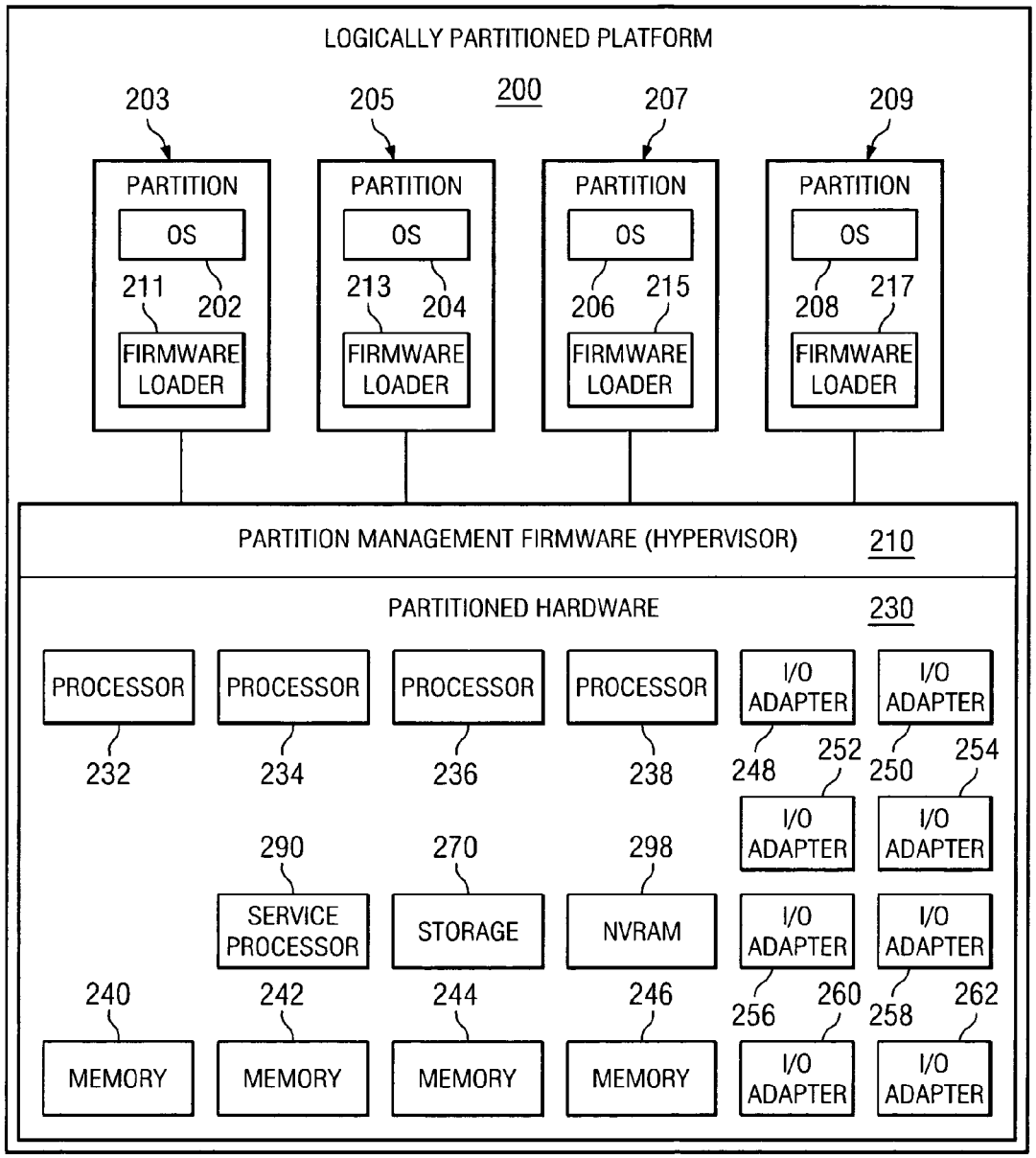
FIG. 2 is a block diagram of an exemplary logically partitioned platform in which the present invention may be implemented in accordance with the present invention.

With reference now to FIG. 2, a block diagram of an exemplary logically partitioned platform is depicted in which the present invention may be implemented. The hardware in logically partitioned platform 200 may be implemented as, for example, data processing system 100 in FIG. 1. Logically partitioned platform 200 includes partitioned hardware 230, operating systems 202, 204, 206, 208, and hypervisor 210. Operating systems 202, 204, 206, and 208 may be multiple copies of a single operating system or multiple heterogeneous operating systems simultaneously run on platform 200. These operating systems may be implemented using OS/400, which are designed to interface with a hypervisor. Operating systems 202, 204, 206, and 208 are located in partitions 203, 205, 207, and 209. Additionally, these partitions also include firmware loaders 211, 213, 215, and 217. When partitions 203, 205, 207, and 209 are instantiated, a copy of the open firmware is loaded into each partition by the hypervisor's partition manager. The processors associated or assigned to the partitions are then dispatched to the partitions' memory to execute the partition firmware.

Partitioned hardware 230 includes a plurality of processors 232-238, a plurality of system memory units 240-246, a plurality of input/output (I/O) adapters 248-262, and a storage unit 270. Partitioned hardware 230 also includes service processor 290, which may be used to provide various services, such as processing of errors in the partitions. Each of the processors 232-238, memory units 240-246, NVRAM storage 298, and I/O adapters 248-262 may be assigned to one of multiple partitions within logically partitioned platform 200, each of which corresponds to one of operating systems 202, 204, 206, and 208.

Partition management firmware (hypervisor) 210 performs a number of functions and services for partitions 203, 205, 207, and 209 to create and enforce the partitioning of logically partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 202, 204, 206, and 208 by virtualizing all the hardware resources of logically partitioned platform 200.

FIG. 3 depicts a high level flow chart which illustrates setting either a machine check operating mode or extended error handling operating mode for a PHB depending on whether all slots below the PHB have devices that support extended error handling in accordance with a preferred embodiment of the present invention. The process starts as depicted by block 300 and thereafter passes to block 302 which illustrates a device driver issuing a "set EEH" call to enable EEH for a device controlled by the device driver in a particular slot coupled to a particular PHB. A device driver may either enable or disable EEH for its slot and hence for its device using either a "set EEH" or "disable EEH" call. This call will either turn EEH on for the slot or turn EEH off for the slot. In addition, transparently to the device driver, when the device driver issues a "set EEH" call, all slots for this particular PHB will be checked to determine whether they are all EEH enabled. If all are EEH enabled, this call will cause EEH to be enabled for the particular PHB. EEH is enabled by setting the PHB's mode bit to a second value that indicates the machine check mode is turned off for this PHB. Next, block 304 depicts determining whether all devices in slots below the PHB support EEH, i.e. whether they are all in EEH mode.

Block 306, then, illustrates a determination of whether or not all of the devices are in EEH mode. If one or more devices are not in EEH mode, the process passes to block 308 which depicts the firmware initializing this PHB so that it is in machine check mode, sometimes referred to as Derr mode. Thus, the PHB's mode bit is set to a first value to indicate that machine check mode is turned on for this PHB. When a PHB is in machine check mode, it will generate a machine check when any device below the PHB reports an error to the PHB. When a machine check is generated by a PHB, all partitions that share the PHB will be terminated and must be rebooted in order to be used. This may result in loss of important data. The process then passes back to block 308.

Referring again to block 306 if a determination is made that all of the devices in slots below this PHB are in EEH mode, the process passes to block 310 which depicts the firmware initializing this PHB in enhanced error handling (EEH) mode. A PHB is set to EEH mode by disabling Derr for the PHB. Typically this is done by setting the mode bit to a predetermined value which when set to that value indicates that Derr is turned off for the PHB. When Derr is turned off for a PHB, that PHB is by definition in EEH mode.

Sometimes EEH mode is referred to as "freeze" mode. In addition, it may be said that an event will "freeze" the PHB. By "freezing" a PHB what is meant is that the PHB will not process data in a normal manner "Freeze" mode is not the same as a PHB being "frozen". "Freeze" mode, as used herein, means that the PHB is in EEH mode with EEH features enabled such that errors will be processed without causing a machine check to occur which would result in the termination of partitions that share this PHB.

Next, block 312 illustrates a determination of whether or not EEH mode is disabled in any slot below this PHB. If a determination is made EEH mode is not disabled in any slot, i.e. all slots are coupled to devices that are EEH enabled, the process passes to block 312.

Referring again to block 312, if a determination is made that one or more slots are coupled to a device that has EEH disabled, the process passes to block 314 which illustrates disabling EEH mode for this PHB. This will cause the PHB to operate in machine check mode instead of EEH mode. Thus, the present invention will detect the current state of devices below the PHB and will dynamically change the mode of the PHB according to the current state of these devices. The process then passes to block 316 which illustrates setting the EADS bit mask to indicate that EEH is now disabled for one or more particular slots. The process then passes back to block 302.

Figure 4:
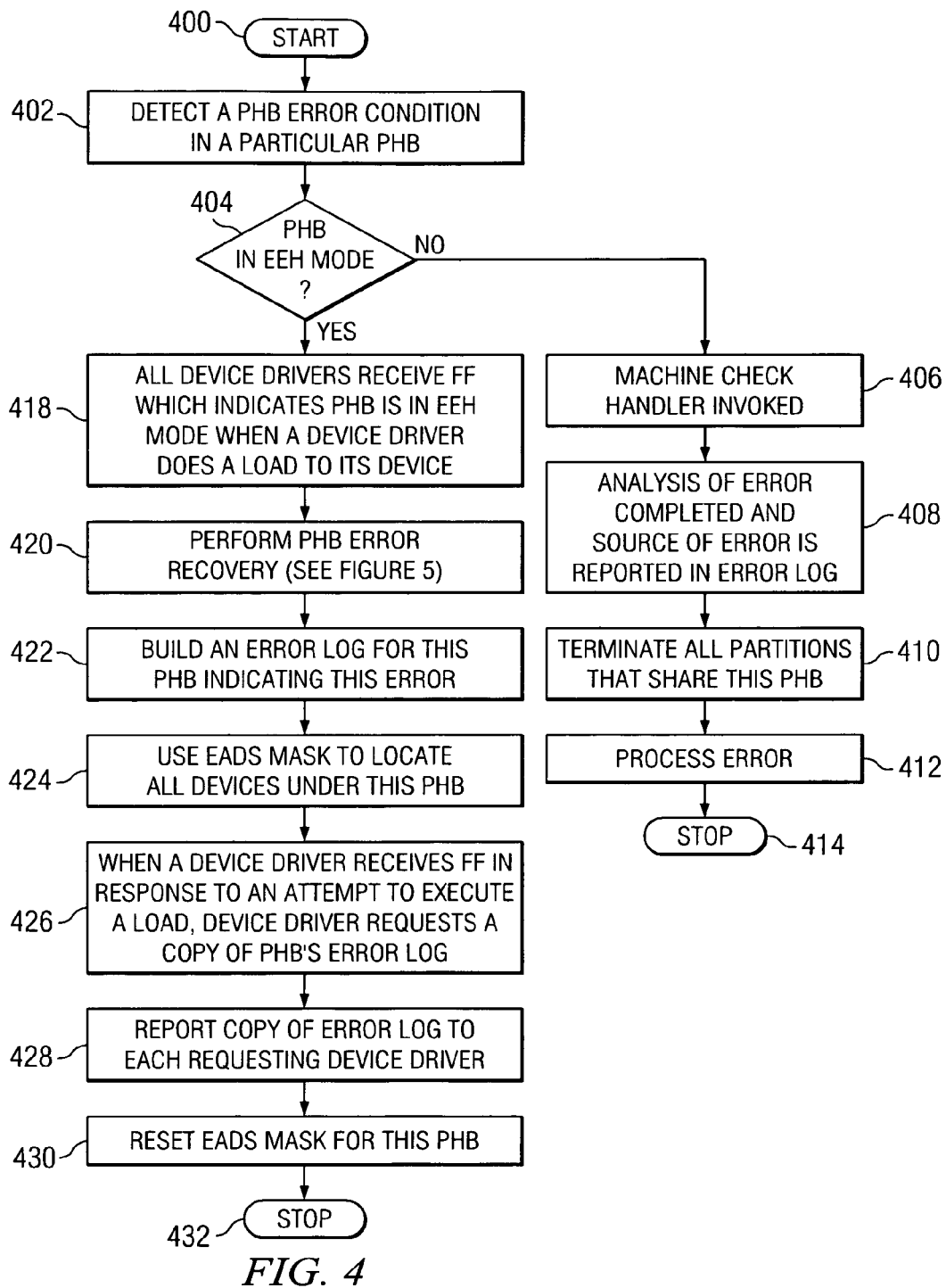
FIG. 4 illustrates a high level flow chart which depicts a PHB processing an error according to the PHB's operating mode in accordance with a preferred embodiment of the present invention.

FIG. 4 illustrates a high level flow chart which depicts a PHB processing an error according to the PHB's operating mode in accordance with a preferred embodiment of the present invention. The process starts as depicted by block 400 and thereafter passes to block 402 which illustrates detecting a PHB error condition on a particular PHB. A PHB error condition occurs when a device below the PHB reports an error to the PHB. Next, block 404 depicts a determination of whether or not the PHB is in EEH mode. If a determination is made that the PHB is not in EEH mode, the process passes to block 406 which illustrates invoking the machine check handler. Next, block 408 depicts an analysis of the error being completed and the source of the error being reported in an error log. The process then passes to block 410 which illustrates terminating all partitions that share this PHB. Thereafter, block 412 depicts processing this error by the machine check handler. The process then terminates as illustrated by block 414.

Referring again to block 404, if a determination is made that the PHB is in EEH mode, the process passes to block 418 which illustrates all device drivers receiving an indication that the PHB is in EEH mode. A typical method for providing this indication is to return a hexadecimal value of "FF" to a device driver when a device driver does a load to its device. Thereafter, block 420 depicts performing PHB error recovery. This process of performing PHB error recovery is described in more detail with reference to FIG. 5.

Next, block 422 illustrates building an error log for this PHB that indicates this error. Thereafter, block 424 depicts using an EADS mask to locate all devices under this PHB. An EADS mask is maintained in the EADS which indicates whether a device is currently coupled to each slot below the PHB. The process then passes to block 426 which illustrates a device driver requesting a copy of the PHB's error log when the device driver receives "FF" in response to an attempt by the driver to execute a load to its device.

Block 428, then, depicts reporting a copy of the error log to each device that requests a copy of the log. This log will indicate that the PHB was in error state and has been recovered. These requests will be made at different times depending on when a particular device driver receives the "FF" indication. The process then passes to block 430 which illustrates resetting the EADS mask for this PHB. The EADS mask is used for reporting errors to the device drivers. When all of the device drivers below a PHB receive an error log, the mask is cleared to indicate that the error has been reported to this PHB. The process then terminates as depicted by block 432.

FIG. 5 depicts a high level flow chart which illustrates performing error recovery for a PHB when the PHB is in extended error handling mode in accordance with a preferred embodiment of the present invention. The process starts as depicted by block 500 and then passes to block 504 which illustrates disabling memory I/O for the PHB that is in an error condition.

The process then passes to block 506 which illustrates disabling PHB arbitration in this PHB which will prevent additional DMA errors during this recovery process. Configuration I/Os will still be enabled and may be received by the PHB. Block 508, then, depicts clearing the PHB error state for this PHB.

Thereafter, block 510 illustrates causing an error in one of the slots below this PHB in order to freeze all slots. When an error is caused in one slot, the device driver will report the error to the EADS which then makes this information available to all devices. This error is caused by writing a non-existing device identifier (ID) to the EADS. The process then passes to block 512 which depicts re-enabling memory I/O and DMA arbitration in this PHB. Thereafter, block 514 illustrates the device driver reprogramming each slot individually as each device accesses its EADS to remove the error from that slot, i.e. to unfreeze that slot. When the error is removed, the slot is reusable and is no longer frozen. Next, block 516 depicts providing an error log. The process then terminates as illustrated by block 518.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a logical partitioned data processing system for providing a host bridge that implements extended error handling in logical partitioned data processing systems, the computer implemented method comprising the steps of:

enabling extended error handling in the host bridge when all devices coupled below the host bridge implement extended error handling;

disabling extended error handling in the host bridge when at least one of the devices coupled below the host bridge does not implement extended error handling;

allocating ones of the devices to a first partition;

allocating other ones of the devices to a second partition;

sharing the host bridge, wherein the host bridge is shared by the first and second partition;

terminating the first and second partition when extended error handling is disabled in the host bridge when an error occurs in one of the devices; and continuing operating the first and the second partitions when extended error handling is enabled in the host bridge when an error occurs in the one of the devices.

2. The computer implemented method according to claim 1, further comprising the steps of:
   dynamically enabling or disabling extended error handling in the host bridge during run time in response to a change in an extended error handling status of the devices.

3. The computer implemented method according to claim 1, further comprising the steps of:
   permitting devices that implement extended error handling and devices that do not implement extended error handling to simultaneously coexist and operate in the system.

4. The computer implemented method according to claim 1, further comprising the steps of:
   determining whether all the devices implement extended error handling;
   initializing the host bridge to operate in extended error handling mode in response to determining that all the devices implement extended error handling; and
   initializing the host bridge to operate in machine check mode in response to determining that at least one of the devices does not implement extended error handling.

5. The computer implemented method according to claim 4, further comprising the steps of:
   responsive to initializing the host bridge to operate in extended error handling mode, determining whether extended error handling has been disabled in one of the devices; and
   responsive to determining that extended error handling has been disabled in one of the devices, initializing the host bridge to operate in machine check mode.

6. The computer implemented method according to claim 1, further comprising the steps of:
   detecting an error condition in the host bridge which puts the host bridge in an error state;
   determining whether the host bridge has extended error handling enabled;
   responsive to determining that the host bridge has the extended error handling enabled, reporting the error condition to all the devices below the host bridge; and
   performing error recovery for the host bridge without terminating any partitions that share the host bridge.

7. The computer implemented method according to claim 6, wherein the step of performing error recovery for the host bridge further comprising the steps of:
   clearing the error state of the host bridge;
   reporting the error condition to all the devices below the host bridge.

8. The computer implemented method according to claim 7, further comprising the steps of:
   responsive to each one of the devices receiving a report of the error condition, executing error recovery in each one of the devices; and
   processing and clearing, by the devices, the error condition without requiring the host bridge during the processing and clearing of the error condition.

9. The computer implemented method according to claim 7, further comprising the steps of:
   disabling the host bridge from generating a machine check during the step of performing error recovery for the host bridge.

10. The computer implemented method according to claim 7, wherein the step of reporting the error condition to all the devices below the host bridge further comprises the steps of:
    building an error log for the host bridge describing the error condition;
    waiting for a device driver to attempt a load to one of the devices;
    responsive to the device driver attempting to load to one of the devices, reporting an error indication to the device driver;
    responsive to the device driver receiving the error indication, receiving a copy of the error log;
    utilizing the copy of the error log by the device driver to attempt to process and clear the error condition.

11. A computer implemented method in a logical partitioned data processing system for providing a host bridge that implements extended error handling in logical partitioned data processing systems, the method comprising the steps of:
    coupling the host bridge to at least one device;
    determining whether all devices coupled to the host bridge implement extended error handling;
    responsive to a determination that all devices that are coupled to the host bridge implement extended error handling, initializing the host bridge to operate in extended error handling mode;
    handling, by the devices, any error that occurs with the devices without reporting the error to the host bridge when the host bridge is operating in extended error handling mode, wherein all partitions that share the host bridge continue to operate without being terminated while the devices are handling the error;
    responsive to a determination that not all devices that are coupled to the host bridge implement extended error handling, initializing the host bridge to operate in non-extended error handling mode;
    generating a machine check by the host bridge in response to an error occurring within one of the devices when the host bridge is operating in non-extended error handling mode; and
    responsive to a receipt of the machine check, terminating all the partitions that share the host bridge.

* * * * *